ALIGNMENT CHANGE INDICATOR FOR MOTOR CAR WHEELS

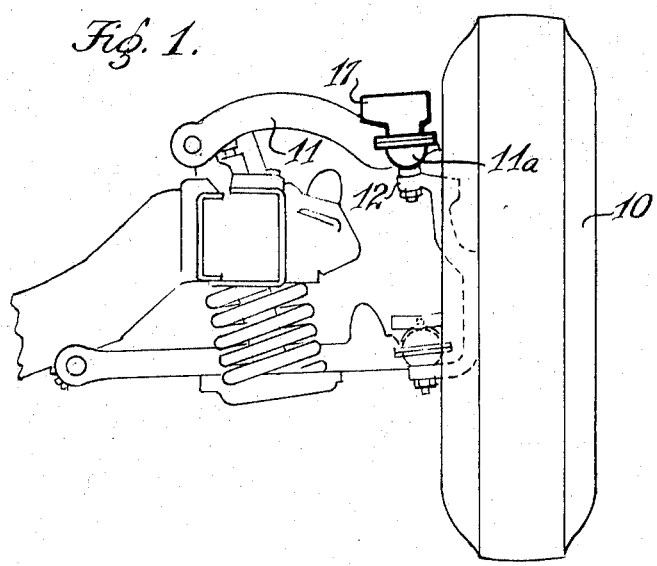
Fig. 1.
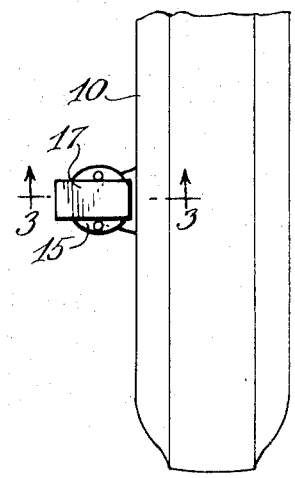
Fig. 2.
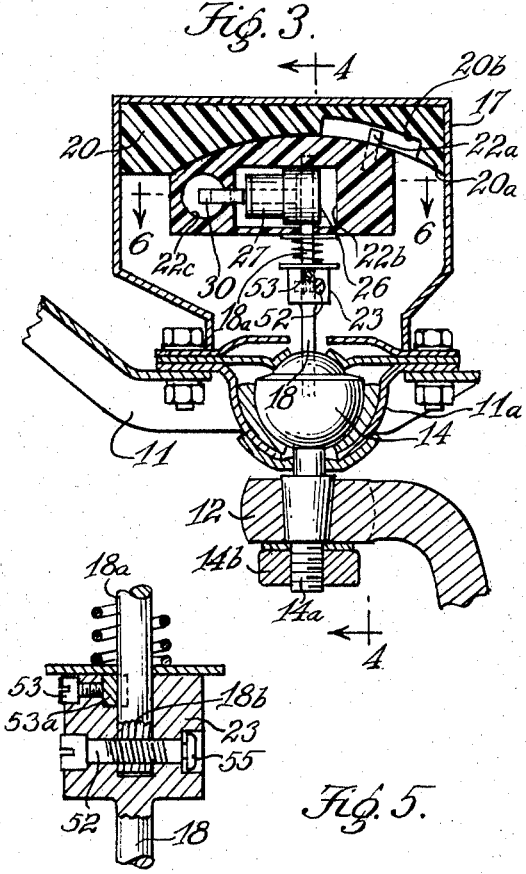
Fig. 3.
Fig. 5.
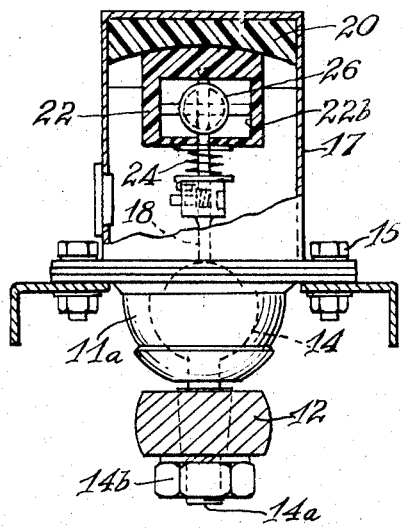
Fig. 4.
Inventor:
Martin Hannapel
By Stevens, Lehrer & Stevens
Attorneys April 15, 1969      M. HANNAPEL      3,438,646

Filed Aug. 28, 1967      Sheet 2 of 2

*Inventor:*
*Martin Hannapel*

By *Stevens, Lehrn & Stevens*
           *Attorneys.*

United States Patent Office 3,438,646
Patented Apr. 15, 1969

3,438,646
ALIGNMENT CHANGE INDICATOR
FOR MOTOR CAR WHEELS
Martin Hannapel, 9316 S. 73rd Ave., P.O. Box 222,
Oaklawn, Ill. 61943
Filed Aug. 28, 1967, Ser. No. 663,580
Int. Cl. B62d; B60g; B60p
U.S. Cl. 280—87
9 Claims

ABSTRACT OF THE DISCLOSURE

A pair of attachments are mounted on a steering frame inwardly of the front wheels of a motor car, the attachments containing magnetic means operating within prescribed limits during the normal operations of the wheels, but going beyond such limits in case the wheels are thrown out of alignment. In such event an extension of the magnetic means to the driver's compartment operates a visual indicator in an electrical circuit—when a switch in the same is closed manually—to show the departures of wheel alignment on a dial.

My invention relates to the setting of motor car front wheels in relation to the tie bar for steering them, in order that such wheels may maintain the prescribed alignment for proper driving direction and minimum tire wear. A ball-joint is involved in the steering connection between the tie bar and the wheel; and the ball-joint turns according to the extent to which the wheel is steered. However, when a wheel is thrown out of alignment, its angle is altered or its steering sweep is moved endwise in one or the other direction; and it is one object of the present invention to bring these manifestations to the attention of the driver as an indication that the alignment of one or the other wheel is no longer normal.

A further object is to provide an attachment in the region of each tie bar connection which is responsive to the axial movements of the ball-joint and effective to plot such movements on a dial easily visible to the driver of the motor car.

Another object is to extend the ball-joint with a center rod and headpiece responsive without incident to the normal movements of the wheel, yet electrically equipped to translate excessive angular movements of the wheels or axial movements of the center rod into pointer movements on a dial from each wheel for indicating departures in the alignment thereof.

An additional object is to include the aforesaid headpiece in an electrical circuit which is normally inactive, but responsive on the pressing of a switch button at any desired time to secure a visual indication of normal wheel alignment or departures therefrom.

A better understanding of the invention may be gained by reference to the accompanying drawings, in which FIG. 1 is a front elevation of one front wheel installation showing the portion of the attachment which is mounted in the region of the ball-joint;

FIG. 2 is a top plan view of the attachment in relation to a fragment of the motor car wheel;

FIG. 3 is a magnified section of the attachment taken on the line 3—3 of FIG. 2;

FIG. 4 is a similar section, taken on the line 4—4 of FIG. 3;

FIG. 5 is an enlarged vertical section of a joint shown in the upper center of FIG. 4;

Figure 6:
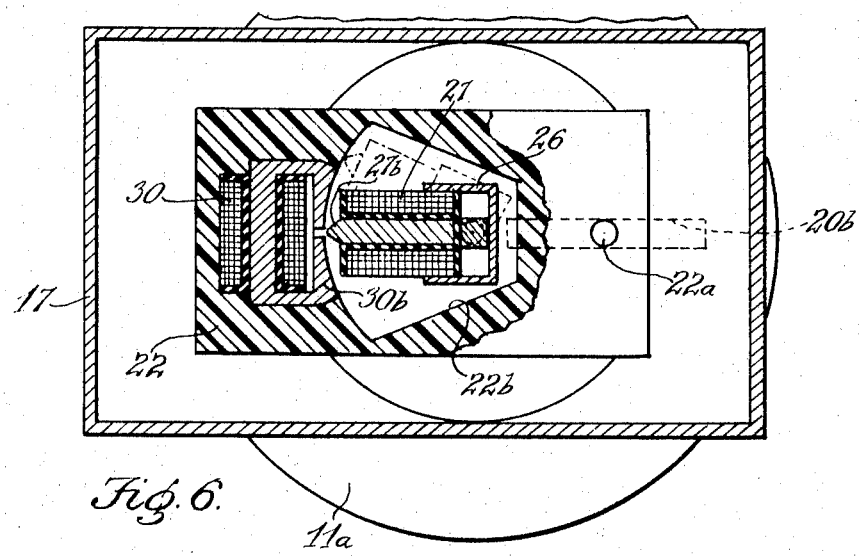
FIG. 6 is a section on the line 6—6 of FIG. 3.

Referring specifically to the drawings, 10 denotes a typical motor car front wheel, 11 a frontal suspension member, and 12 the upper bend of the steering connection from the tie bar assembly to the wheel shown. The member 11 carries a socket 11a for the ball-joint 14; and the latter is extended in the form of a threaded stem 14a secured to the connection by a nut 14b.

For the purpose of the present invention, the bolts 15 for the socket 11a are employed to secure a housing 17 over the same as an attachment, while other parts—to be described later—lead from the attachment to the dash of the motor car for connection with the visual indicator previously mentioned. As viewed in FIG. 3, the ball-joint 14 is designed to rotate in one or the other direction when the wheel 10 is steered accordingly; and a properly aligned wheel assumes a prescribed sweep in relation to the steering connection. However, when the wheel is thrown out of alignment, its angle may change, or the sweep described by the wheel may move endwise in one or the other direction. The present invention utilizes the altered or excessive wheel positions or movements for alignment indication, and originates with a center rod 18 fitted to extend upwardly from the ball-joint into the housing 17, as shown in FIGS. 3 and 4.

The housing 17 is quite small and made of sheet metal; and it is elongated transversely of the motor car, as indicated in FIG. 1. The housing is designed to undergo a transverse arcuate movement, and therefore has a ceiling insert 20 concaved accordingly on the under side, as indicated at 20a. A block 22 is situated below the insert, and is convexed to suit the aforesaid movement. Since the insert and block are in an electrical environment, they are made of insulation material. The vibration of the suspension member 11 from routine road irregularities is designed to induce the aforementioned arcuate movement of the housing 17. The center rod first carries a joint 23—whose details will be described later—and continues as an upward extension 18a to journal the block 22, the extension receiving a coil spring 24 between the joint 23 and the block for maintaining the latter seated in the insert 20. In order to insure the alignment of the block in the insert, the block is extended with a pin 22a which rides in a slot 20b of the insert during the arcuate movements of the housing, as shown in FIG. 3.

FIGS. 3 and 4 show that the block 22 has a cavity 22b in the center to accommodate a ring 26 through which the extension 18a of the center rod 18 passes and terminates in the upper portion of the block. The ring carries an electro-magnet 27 which presents an armature 27a toward the end of the block, where a second cavity 22c is located. This cavity contains an induction coil 30 whose core 30a presents a field piece 30b in the sweeping path of the armature 27a of the electro-magnet 27, such armature being pointed at 27b as clearly shown in FIG. 6.

Figure 7:
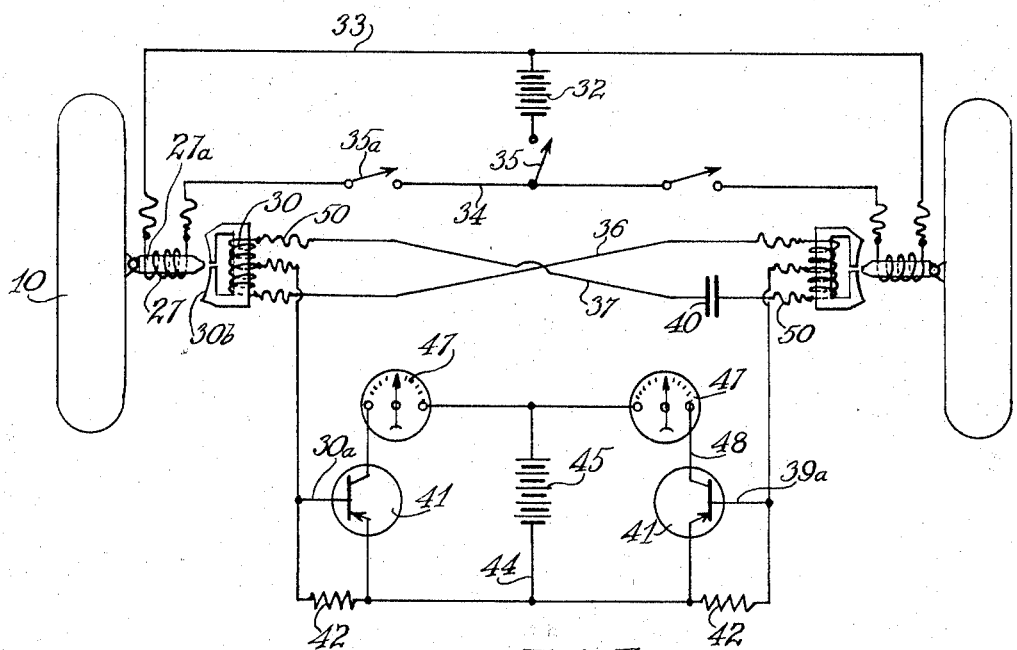
FIG. 7 is a schematic plan view of the attachments for both front wheels as included in the electrical circuit.

In order to translate the sweeping travel of the two armatures 27a into signals visible to the driver of the motor car, an electrical circuit illustrated in FIG. 7 is employed. Thus, one terminal of the 12-volt motor car battery 32 is connected by conductors 33 to the outer terminals of the electromagnet 27; and a conductor 34 connects the outer terminals of the electro-magnets, and receives a center finger switch 35 to the other terminal of the battery and switches 35a laterally of the finger switch. Opposite terminals of the induction coil 30 are connected by crossed conductors 36 and 37, while center terminals of the coil extend with conductors 38 and 39 toward the dash of the motor car. The conductor 37 receives a capacitor 40. The conductors 38 and 39 first extend with branches 38a and 39a to a pair of transistors 41, then connect with resistance coils 42, and finally join in a conductor 43. The latter has a branch 44 which receives an auxiliary battery 45 of low voltage; and the branch 44 has side extensions 46 to one of the terminals of a pair of ammeters 47. The other terminals of the latter connect at 48 with the transistors 41.

According to FIG. 3, normal operation of the indicator attachment occurs when the suspension member 11 and housing 17 are still or rock from side to side during the swerving of the motor car wheels from slight irregularities in the pavement, and when the sweep of the electromagnet 27 has limits equidistant from the center and corresponding to the prescribed or proper setting of the sweep of the motor car wheels. However, should a wheel turn out of alignment, the corresponding twist of the electromagnet would cause it to depart from its original sweep in the corresponding direction. According to FIG. 6 and the electrical circuit, this action upsets the electrical equalizing force from each wheel, induces a greater impulse from one induction coil 30 than from the opposite coil, and affects the pointers of the corresponding ammeters to indicate the extent to which the wheels are out of alignment.

The tapered end 27b of the electro-magnet armature 27b procures an intensified impulse from the ammeters to make them more sensitive to departures of wheel alignment at the straight-forward position of the wheels. Also, the electrical diagram shows that portions of the electrical conductors in the environment of the block 22 are in the form of springs 50 which make allowance for the oscillating movements of the block. Further, it is understood that the indicator does not deal with the rectangular normal position of the wheels, but with wheels which are normal when directed with a caster toward the top and a gather toward the front.

It is now evident that the added turn of the ball 14 from an alignment departure which changes the electromagnet centering of the induction coils, changes their canceling relation throughout steering whereby one coil will not completely cancel the other, the difference between the coils registering on the meters. Further, where a shock momentarily changes the alignment of a wheel, the ball-joint extension 18a moves toward and away from the frame of the car, causing the block 22 to oscillate accordingly until the wheel comes to rest. In the event of such a change, the corresponding effect on the induction coils will be to indicate the change in alignment.

The function of the switches 35a is to check whether the rear wheels of the motor car track with the front wheels. Thus, in case the rear wheels track to one side of the front ones while the car is in forward motion, one switch 35a should be turned off. If at such time the armature 27b is not in the middle of the field piece 30b, there will be an ammeter deflection.

A joint 23 has been mentioned as located between the center rod 18 and the extension 18a. The purpose of this joint is to allow fine rotary adjustments of the extension in relation to the center rod in order to lend the electromagnet armature 27 a greater degree of accuracy. According to FIG. 5, the joint is a socket in which the center rod extension 18a terminates as a worm 18b. A side screw 52 is directed into the socket to turn the worm; and another side screw 53 bears against the extension with a shoe 53a to tighten the adjustment of the extension. When a setting of the latter has been fixed as mentioned, vibration may cause the side screw 52 to turn loose and fall out of the joint. A second set screw 55 is therefore directed endwise against the side screw to jam the same against loosening.

It is now apparent that the invention applies a small attachment inwardly of each front wheel, and leads wires to the region of the dash for translating the impulses in the attachment into ammeter indications of normal or faulty wheel alignment. Such indications are obtainable by the simple push of a finger switch; or a flasher may be interposed in the finger switch circuit to make the pointers of the ammeters vibrate when the wheels are out of alignment, so that the greater the vibrations of the pointers from zero the greater the degree of alignment departure.

I claim:

1. The combination with a motor car steering assembly in which a ball-joint rotates on its axis within prescribed limits during steering movements of the wheel and to excess from departures in wheel alignment, such ball-joint extended with an axial rod in a frame tiltable from side to side from road irregularities encountered by the wheel; of means actuated by said rod to indicate such departures.

2. The structure of claim 1, said means extending with a signal in the driver's compartment of the motor car.

3. The structure of claim 1, said means extending with a visual signal in the driver's compartment of the motor car.

4. The structure of claim 1, said means including an electro-magnetic control.

5. The structure of claim 1, said means including an electro-magnet carried by the axial rod, an induction coil influenced by rotary movements of the electromagnet, a visual indicator unit, and an electrical circuit containing the induction coil and said unit.

6. The structure of claim 1, said means including a housing mounted on the steering assembly, a block of insulating material carried by the axial rod within the housing, an electromagnet contained within the block and carried by the axial rod, an induction coil also contained in the block and influenced by the rotary movements of the electromagnet, an indicator in the driver's compartment of the motor car, and an electrical circuit containing the induction coil and said indicator.

7. The structure of claim 1, said means including a housing mounted on the steering assembly, a block of insulating material carried by the axial rod within the housing, an electromagnet contained within the block and carried by the axial rod, an induction coil also contained in the block and influenced by the rotary movements of the electromagnet, an indicator in the driver's compartment of the motor car, an electrical circuit containing the induction coil and said indicator, and a guide in the housing for aligning the block with the tilting movements of the frame.

8. The structure of claim 1, said means including a housing mounted on the steering assembly, a block of insulating material carried by the axial rod within the housing and formed with an arcuate periphery and projecting pin, a guide in the housing concaved opposite said periphery and containing a slot in the direction of the frame tilt, the slot receiving the pin to align the block with the tilting movements of the frame, an electromagnet contained in the block and carried by the axial rod, an induction coil also contained in the block and influenced by the rotary movements of the electromagnet, an indicator in the driver's compartment of the motor car, and an electrical circuit containing the induction coil and said indicator.

9. The structure of claim 1, the rod made with original and extended portions, a joint between these for procuring the rotary adjustment of the extended portion, said means including an electromagnet carried by the axial rod, an induction coil influenced by the rotary movements of the electromagnet, a visual indicator unit, and an electrical circuit containing the induction coil and said unit.

References Cited

UNITED STATES PATENTS

| | | | |
|---|---|---|---|
| 2,624,123 | 1/1963 | Wilkerson | 33—203.2 |
| 2,672,597 | 3/1954 | Ritch | 340—52 |
| 2,754,499 | 7/1956 | Jost | 340—52 |
| 2,907,578 | 10/1959 | Taber. | |
| 2,923,555 | 2/1960 | Kost et al. | 280—96.1 |
| 3,075,784 | 1/1963 | Beyerstedt | 280—95 X |

KENNETH H. BETTS, *Primary Examiner.*

U.S. Cl. X.R.

33—203; 280—96.2; 340—52